(12) United States Patent
Wu et al.

(10) Patent No.: US 11,947,219 B2
(45) Date of Patent: Apr. 2, 2024

(54) BACKLIGHT MODULE AND CURVED DISPLAY DEVICE

(71) Applicants: BEIHAI HKC OPTOELECTRONICS TECHNOLOGY CO., LTD., Beihai (CN); HKC CORPORATION LIMITED, Shenzhen (CN)

(72) Inventors: Li Wu, Beihai (CN); Hsu Kang Lo, Beihai (CN); Haijiang Yuan, Beihai (CN)

(73) Assignees: BEIHAI HKC OPTOELECTRONICS TECHNOLOGY CO., LTD., Beihai (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/063,848

(22) Filed: Dec. 9, 2022

(65) Prior Publication Data

US 2023/0408866 A1 Dec. 21, 2023

(30) Foreign Application Priority Data

May 26, 2022 (CN) .......................... 202210584056.0

(51) Int. Cl.
*G02F 1/13357* (2006.01)
*F21V 8/00* (2006.01)
*G02F 1/1333* (2006.01)

(52) U.S. Cl.
CPC ..... *G02F 1/133608* (2013.01); *G02B 6/0051* (2013.01); *G02B 6/0088* (2013.01);
(Continued)

(58) Field of Classification Search
CPC ......... G02F 1/133305; G02F 1/133314; G02F 1/133317; G02F 1/133325;
(Continued)

(56) References Cited

U.S. PATENT DOCUMENTS

| 2014/0009914 A1* | 1/2014 | Cho ........................ G09F 9/35 361/679.01 |
| 2014/0111736 A1 | 4/2014 | An et al. |

(Continued)

FOREIGN PATENT DOCUMENTS

| CN | 104965329 A | 10/2015 |
| CN | 204945551 U | 1/2016 |

(Continued)

OTHER PUBLICATIONS

First Office Action issued in counterpart Chinese Patent Application No. 202210584056.0, dated Feb. 14, 2023.
(Continued)

*Primary Examiner* — Keith G. Delahoussaye

(57) ABSTRACT

Disclosed are a backlight module and a curved display device. The backlight module includes a backplane and a backlight. The backplane includes a backplane body and two arc fixing components. The backplane body is provided with two opposite arc sides and each arc fixing component is correspondingly detachably installed at each arc side to restrict a curvature of the backplane body. A mounting groove is formed by the cooperative enclosure of two arc fixing components and an inner surface of the backplane body. The backlight is provided into the mounting groove.

14 Claims, 5 Drawing Sheets

(52) U.S. Cl.
CPC .. *G02F 1/133305* (2013.01); *G02F 1/133314* (2021.01); *G02F 1/133317* (2021.01); *G02F 1/133325* (2021.01); *G02F 1/133328* (2021.01); *G02F 1/133603* (2013.01); *G02F 1/133604* (2013.01); *G02F 2201/46* (2013.01); *G02F 2201/465* (2013.01)

(58) Field of Classification Search
CPC ......... G02F 1/133603; G02F 1/133604; G02F 1/133608; G02F 2201/46; G02F 2201/465
See application file for complete search history.

(56) References Cited

U.S. PATENT DOCUMENTS

| | | | | |
|---|---|---|---|---|
| 2015/0062480 | A1* | 3/2015 | Cho | G02F 1/133308 349/58 |
| 2016/0161085 | A1* | 6/2016 | Kwon | G02F 1/133305 362/97.1 |
| 2017/0168345 | A1* | 6/2017 | Wu | G02F 1/133308 |

FOREIGN PATENT DOCUMENTS

| | | |
|---|---|---|
| CN | 205015581 U | 2/2016 |
| CN | 106597742 A | 4/2017 |
| CN | 109427252 A | 3/2019 |
| CN | 210720932 U | 6/2020 |
| KR | 20150077156 A | 7/2015 |
| KR | 102118653 B1 | 6/2020 |

OTHER PUBLICATIONS

Second Office Action issued in counterpart Chinese Patent Application No. 202210584056.0, dated Apr. 18, 2023.

* cited by examiner

BACKLIGHT MODULE AND CURVED DISPLAY DEVICE

CROSS-REFERENCE TO RELATED APPLICATIONS

This application claims priority to Chinese Patent Application No. 202210584056.0, filed on May 26, 2022, the entire contents of which are incorporated herein by reference.

TECHNICAL FIELD

The present disclosure relates to the technical field of display devices, in particular to a backlight module and a curved display device.

BACKGROUND

As semiconductor technology continuously develops, mini-light emitting diodes (LED) have gradually been applied because of better brightness uniformity and higher color contrast. Besides, curved displays are becoming widely used because they conform to the curved structure of the user's pupil and provide the best viewing effect. The curved mini-LED can combine the advantages of the mini-LED and the curved display, which can bring users a better viewing experience and greater visual impact. At present, the methods for manufacturing the curved backplane are as follows. The first one is to bend the backplane in multiple sections and form the curved backplane by splicing the multiple sections of the backplane. However, such manufacturing method is prone to producing seams, resulting in deviations in curvature accuracy and difficult processing. The second one is to use a mold to integrally form the curved backplane. However, the thickness of the backplane is too large because of the size limitation of mold, the overall thickness and weight of the curved backplane are difficult to control, resulting in unstable curvature. In addition, the curvature cannot be changed once the curved backplane is molded.

SUMMARY

The main objective of the present disclosure is to provide a backlight module, which aims to obtain a backlight module with a changeable curvature and a smaller thickness.

In order to achieve the above objective, the backlight module includes a backplane and a backlight. The backplane includes a backplane body and two arc fixing components. The backplane body is provided with two arc sides opposite to each other and one of the two arc fixing components is detachably installed at one of the two arc sides to define a curvature of the backplane body. The two arc fixing components are enclosed with an inner surface of the backplane body to form a mounting groove. The backlight is provided into the mounting groove.

In an embodiment, each arc fixing component includes a first arc member and a second arc member; the first arc member is provided on one surface of one arc side, the second arc member is provided on the other surface of the arc sides and detachably connected to the first arc member to clamp the arc side; two second arc members are enclosed with the backplane body to form the mounting groove; and the backlight is embedded into the mounting groove.

In an embodiment, the first arc member includes a first side and a second side; an angle is formed between the first side and the second side; the first side is attached to the other surface of the arc side and is detachably connected to the second arc member; and the second side is in abutment with a lateral surface of the arc side.

In an embodiment, the first side is defined with a first connecting hole, the second side is defined with a second connecting hole and the arc side is defined with a third connecting hole; a connecting member is configured to successively pass through the first connecting hole, the third connecting hole and the second connecting hole to connect to the second arc member, the backplane body and the first arc member; and/or the arc side is defined with a first clamping hole, one of the first side and the second arc member is defined with a second clamping hole, a surface of the other one of the first side and the second arc member is provided with a clamping protrusion, and the clamping protrusion is configured to pass through the first clamping hole to be inserted into the second clamping hole.

In an embodiment, the backlight module further includes an optical film; the second side protrudes from a surface of the second arc member away from the first side, the second side and the surface of the second arc member away from the first side cooperatively define a clamping groove, and the optical film is provided in the clamping groove and covers an opening of the mounting groove.

In an embodiment, the optical film includes a diffusion plate, the diffusion plate is attached to the surface of the second arc member away from the first side, a gap is formed between the diffusion plate and the backlight, and a thickness of the second arc member is equal to a sum of a width of the gap and a thickness of the backlight.

In an embodiment, the optical film is provided on a light-emitting side of the backlight.

In an embodiment, the backlight includes a plurality of lamp beads distributed in an array, the backlight module satisfies the following relationship:

$$d=3*p/(4*\tan 0.5a);$$

d represents the width of the gap, p represents a distance between two lamp beads, and a represents a light-emitting angle of each of the lamp beads; and/or the backlight is plate-shaped, and the backlight is screwed or snap-connected to the backplane body.

In an embodiment, the backlight module further includes a plastic frame; the plastic frame includes a first frame and a second frame; an angle is formed between the first frame and the second frame, the first frame is detachably connected to the second side, and the second frame covers an opening of the clamping groove.

In an embodiment, the first frame is integrally formed with the second frame.

In an embodiment, the backlight module further includes a rear shell, the rear shell includes a bottom plate and a side plate provided at a periphery of the bottom plate; the bottom plate is in abutment with a surface of the first side away from the optical film, and the side plate is wrapped around an outer periphery of the first frame and is detachably connected to the first frame.

In an embodiment, a backplane body surface away from the backlight is provided with a heat sink, a thickness of the heat sink is less than or equal to the thickness of the second arc member.

In addition, the present disclosure further provides a curved display device. The curved display device includes a backlight module and a display panel provided on a light-emitting side. The backplane includes a backplane body and two arc fixing components. The backplane body is provided with two arc sides opposite to each other and one of the two arc fixing components is detachably installed at one of the two arc sides to define a curvature of the backplane body. The two arc fixing components are enclosed with an inner surface of the backplane body to form a mounting groove. The backlight is provided into the mounting groove.

In technical solutions of the present disclosure, the backlight module includes a backplane and a backlight provided on the backplane. The backplane includes a backplane body and an arc fixing component connected to the arc side of the backplane body. The curvature of the arc fixing component is fixed. The processing substrate of the backplane body is in the form of planar sheet or plate. A curved backplane body with a fixed curvature is formed by the definition of the arc fixing component. That is, the backplane body has two arc sides. The arc side is correspondingly connected to the arc fixing component one by one, thus the backplane with uniform curvature and higher accuracy can be obtained, which improves the problem that the thickness of the backplane is too large because of the size limitation of mold. Besides, the seams disappear and the processing is convenient. Meanwhile, the two arc fixing components are detachably connected to the backplane body. The arc fixing components with different curvatures can be replaced as needed, and the backplane body may have different curvatures to be applied to different modules with the same size and different curvatures. Thus, the backplane module has wide applicability, is easy to be assembled, and can effectively reduce material cost. Further, the backlight is fixedly placed into the mounting groove of the backplane, which can improve the accuracy of its installation positioning, and does not occupy additional space under the setting of the arc fixing component, which can effectively reduce the thickness of the backlight module and obtain a thinner curved display device.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

Figure 1:
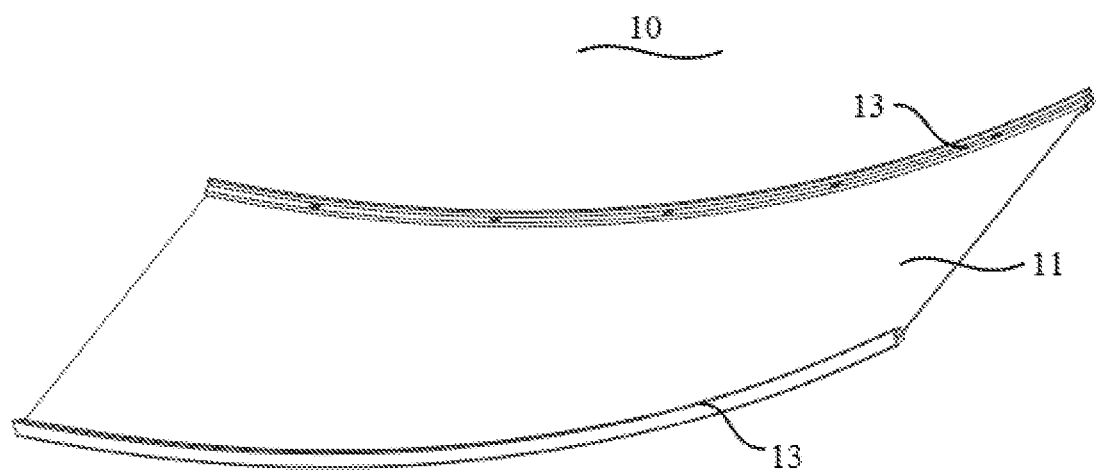
FIG. 1 is a schematic structural view of a backplane in a backlight module according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of embodiments of the present disclosure will be clearly and completely described with reference to the drawings of the present disclosure. Obviously, the described embodiments are only some rather than all of the embodiments of the present disclosure. Based on the embodiments of the present application, all other embodiments obtained by those of ordinary skilled in the art without creative efforts shall fall within the scope of the present disclosure.

It should be noted that all directional indicators (such as up, down, left, right, front, rear, etc.) in the embodiments of the present disclosure are only used to explain the relative positional relationship, movement situation, etc. between components in a specific attitude (as shown in the drawings). If the specific attitude changes, the directional indication also changes accordingly.

In the present disclosure, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those of ordinary skilled in the art, the specific meaning of the above-mentioned terms in the present disclosure can be understood according to specific situations.

In addition, the descriptions related to "first", "second" and the like in the present disclosure are merely for descriptive purposes, and should not be understood as indicating or implying their relative importance or implicitly indicating the number of technical features indicated. Therefore, the feature defined by "first" and "second" may explicitly or implicitly include at least one such feature. Besides, the meaning of "and/or" in the full text includes three parallel solutions. For example, "A and/or B" includes only A, or only B, or both A and B. The various embodiments can be combined with each other, but the combination must be based on what can be achieved by those of ordinary skill in the art. When the combination of the embodiments is contradictory or cannot be achieved, it should be considered that such a combination does not exist, or is not within the scope of the present disclosure.

The present disclosure provides a backlight module applied to a curved display device.

Figure 2:
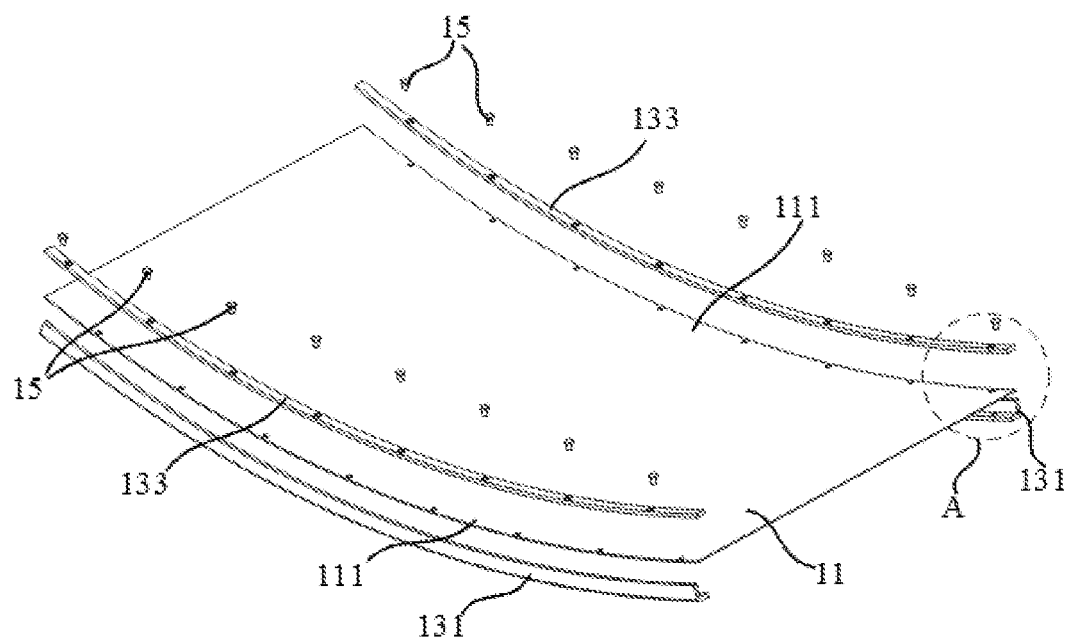
FIG. 2 is a schematic exploded view of the backplane in FIG. 1.
Figure 5:
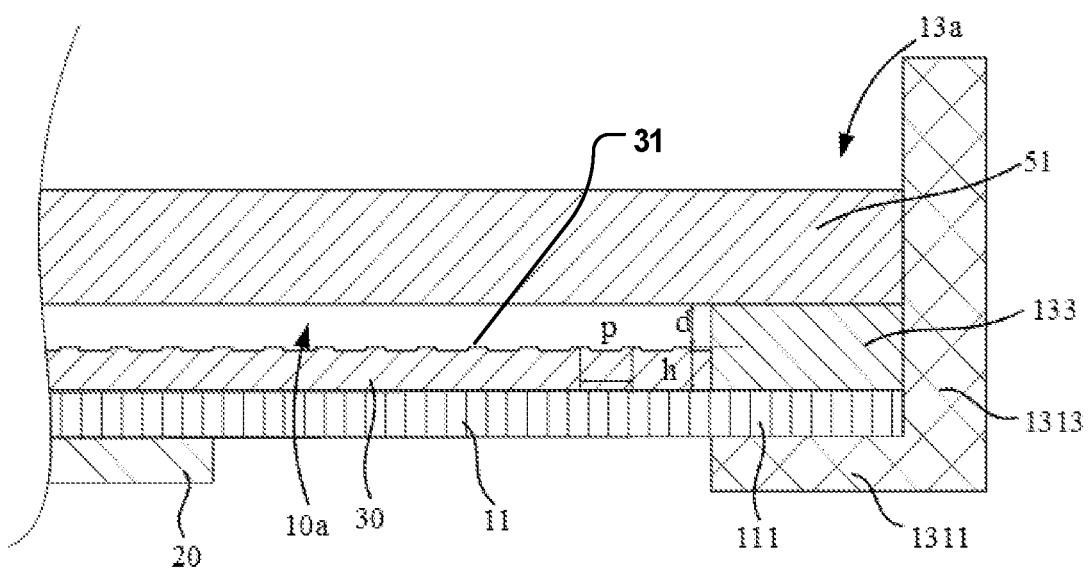
FIG. 5 is a partial schematic cross-sectional view of the backlight module along a longitudinal direction according to an embodiment of the present disclosure.

As shown in FIG. 1, FIG. 2 and FIG. 5, in an embodiment of the present disclosure, the backlight module 100 includes a backplane 10 and a backlight 30. The backplane 10 includes a backplane body 11 and two arc fixing components 13. The backplane body 11 is provided with two arc sides 111 opposite to each other, and one of the two arc fixing components 13 is detachably installed at one of the two arc sides 111 to define a curvature of the backplane body 11. The two arc fixing components 13 are enclosed with an inner surface of the backplane body 11 to form a mounting groove 10a. The backlight 30 is provided into the mounting groove 10a.

It is understandable that the display device is generally cuboid in shape, so it has two pairs of two sides opposite to each other. In this embodiment, since the backlight module 100 is applied to the curved display device 1000, at least two sides opposite to each other of the backlight module 100 are curved. The backlight module 100 has two arc sides 111 opposite to each other and two straight sides opposite to each other. The backplane 10 is the mounting base and the bearing base in the backlight module 100. That is, the backplane 10 also has two arc sides 111 opposite to each other. Thus, the backlight 30 mounted on the backplane 10 is also curved. The backplane 10 includes a backplane body 11 and two curved fixing components provided on the two arc sides 111 of the backplane body 11. The backplane body 11 can be a sheet or a thin plate and can be made of metal, ceramic, carbon fiber or polymeric materials, etc., to ensure a smaller thickness and good structural strength, which is conducive to manufacturing a thinner backlight module 100.

Each arc fixing component 13 may be an integrate structure or a split structure, which is not limited herein. The arc fixing component 13 needs to be made of a rigid material, such as metal or ceramic with a certain structural rigidity, so as to have a stable curvature. Thus, when the arc fixing component 13 is fixed on the backplane body 11, the backplane body 11 may obtain a stable and uniform target curvature. The two arc fixing components 13 are detachably connected to the two corresponding arc sides 111 of the backplane body 11 one to one. That is, one of the arc fixing components 13 is connected to one of the arc sides 111, and the other arc fixing component 13 is connected to the other arc side 111. The connection can be threaded connection, snap connection or plug connection, etc., which is not limited here. When the two arc fixing components 13 are respectively installed on the two arc sides 111, the two arc fixing components 13 will protrude from the surface of the backplane body 11, and the two arc fixing components 13 will be enclosed with the surface of the backplane body 11 to form the mounting groove. The surface of the backplane body 11 forming the mounting groove 10*a* is the concave surface of the backplane body 11. The backlight 30 can be installed into the mounting groove 10*a*, and the existing space can be used to install the backlight 30, which can effectively reduce the overall thickness of the backlight module 100. The backlight 30 is a direct type light source herein.

In technical solutions of the present disclosure, the backlight module 100 includes a backplane 10 and a backlight 30 provided on the backplane 10. The backplane 10 includes a backplane body 11 and an arc fixing component 13 connected to the arc side 111 of the backplane body 11. The curvature of the arc fixing component 13 is fixed. The processing substrate of the backplane body 11 is in the form of planar sheet or plate. A curved backplane body with a fixed curvature is formed by the definition of the arc fixing component. That is, the backplane body has two arc sides 111. The arc side 111 is connected to the arc fixing component 13, thus the backplane 10 with uniform curvature and higher accuracy can be obtained, which improves the problem that the thickness of the backplane is too large because of the size limitation of mold. Besides, the seams disappear and the processing is convenient. Meanwhile, the two arc fixing components 13 are detachably connected to the backplane body 11. The arc fixing components 13 with different curvatures can be replaced as needed, and the backplane body 11 may have different curvatures to be applied to different modules with the same size and different curvatures. Thus, the backplane module has wide applicability, is easy to be assembled, and can effectively reduce material cost. Further, the backlight 11 is fixedly placed into the mounting groove 10*a* of the backplane 10, which can improve the accuracy of its installation positioning, and does not occupy additional space under the setting of the arc fixing component 13, which can effectively reduce the thickness of the backlight module 100 and obtain a thinner curved display device 1000.

As shown in FIG. 2 and FIG. 5, in an embodiment, each arc fixing component 13 includes a first arc member 131 and a second arc member 133. The first arc member 131 is provided on one surface of one arc side 111, and the second arc member 133 is provided on the other surface of the arc sides 111 and detachably connected to the first arc member 131 to clamp the arc side 111. Two second arc members 133 are enclosed with the backplane body 11 to form the mounting groove 10*a*. The backlight 30 is embedded into the mounting groove 10*a*.

In this embodiment, the arc fixing component 13 is a split structure, including a first arc member 131 and a second arc member 133, which facilitates to clamp the arc side 111. Specifically, the first arc member 131 and the second arc member 133 are separately provided on the two opposite surfaces of the arc side 111. It can be understood that the arc side 111 is a lateral structure of the backplane body 11, which may include two surfaces on the same surfaces as the backplane body 11 and a side surface connecting the two surfaces. When the first arc member 131 and the second arc member 133 clamp the arc side 111, it can effectively facilitate to bend the backplane body 11 and ensure the curvature stability of each part of the backplane body 11. The material of the first arc member 131 and the second arc member 133 can be the same, which can make the processing more convenient. The shape of the first arc member 131 may be the same as the shape of the second arc member 133, for example, both can be in the form of a thin arc plate. Besides, the shape and the structure of the first arc member 131 and the second arc member 133 can be different, which is not limited herein.

Meanwhile, the backlight 30 is provided as an integral structural member, and the second arc member 133 is enclosed with the backplane body 11 to form the mounting groove 10*a*. The backlight 30 can be embedded into the mounting groove 10*a*, the positioning accuracy and the installation stability of the backlight 30 can be improved. The arc fixing components 13 are distributed on both sides of the arc side 111. The overall thickness of the backlight module 100 can be effectively reduced, and a more ultra-thin curved display device 1000 can be obtained. In other embodiments, the backlight 30 can also be configured as a plurality of individually connected lamp beads 31.

Figure 3:
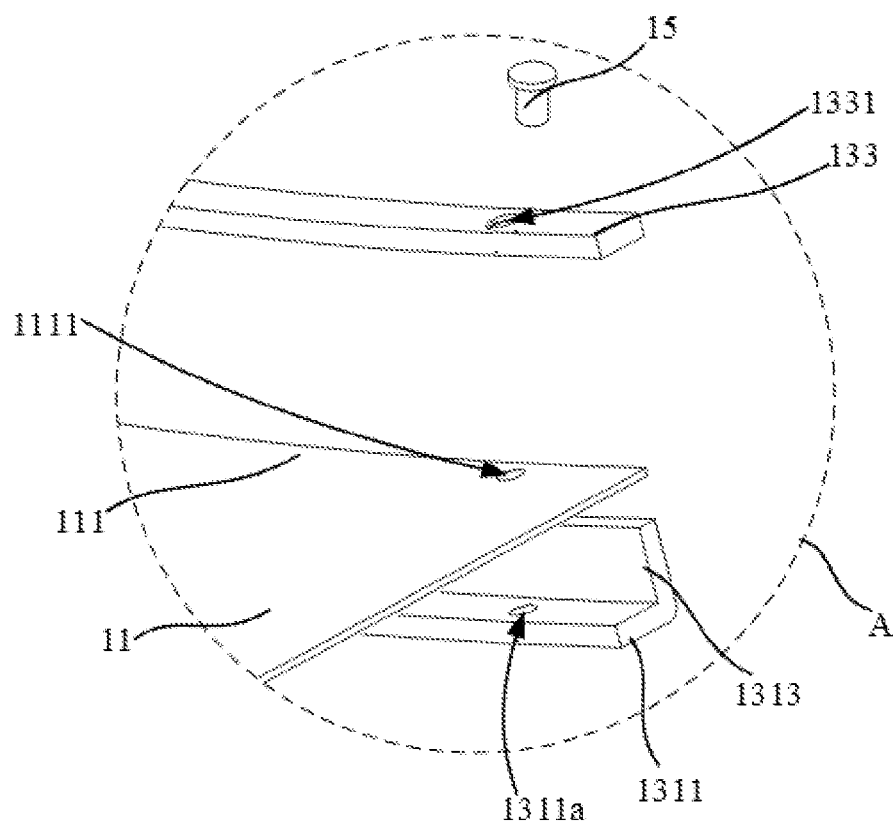
FIG. 3 is a schematic enlarged view at portion A in FIG. 2.

As shown in FIG. 3 and FIG. 5, in an embodiment, the first arc member 131 includes a first side 1311 and a second side 1313. An angle is formed between the first side 1311 and the second side 1313. The first side 1311 is attached to the other surface of the arc side 111 and is detachably connected to the second arc member 133. The second side 1313 is in abutment with a lateral surface of the arc side 111.

In this embodiment, the first arc member 131 includes the first side 1311 and the second side 1313. An angle is formed between the first side 1311 and the second side 1313, such as 90 degrees, 70 degrees or 120 degrees, or the like, which is not limited herein. The first side 1311 is opposite to the second arc member 133 to clamp the arc side 111, and the second side 1313 is in abutment with the lateral surface of the arc side 111, which can further enhance the clamping of the backplane body 11 to ensure the curvature of the backplane body 11. Therefore, the angle between the first side 1311 and the second side 1313 can also be adjusted according to the lateral surface of the arc side 111. The lateral surface of the arc side 111 is perpendicular to the plate surface, so the first side 1311 and the second side 1313 are vertical, which can ensure the fixation stability of the arc side 111. The first side 1311 can be integrally formed with the second side 1313, so as to ensure the structural strength of the first arc member 131, enhance the fixation stability of the backplane body 11, and further ensure the stability of curvature.

During installation, firstly, the arc side 111 of the backplane body 11 is placed on the first side 1311 and is in abutment with the second side 1313, and then the second arc member 133 is placed on the upper surface of the arc side 111, thereby completing the connection with the first side 1311. In this way, it is also beneficial to the positioning of the backplane body 11 and facilitates assembly.

As shown in FIG. 3, in an embodiment, the first side 1311 is defined with a first connecting hole 1311a, the second side 1313 is defined with a second connecting hole 1331 and the arc side 111 is defined with a third connecting hole 1111. A connecting member 15 is configured to successively pass through the first connecting hole 1311a, the third connecting hole and the second connecting hole 1331 to connect to the second arc member 133, the backplane body 11 and the first arc member 131.

Figure 4:
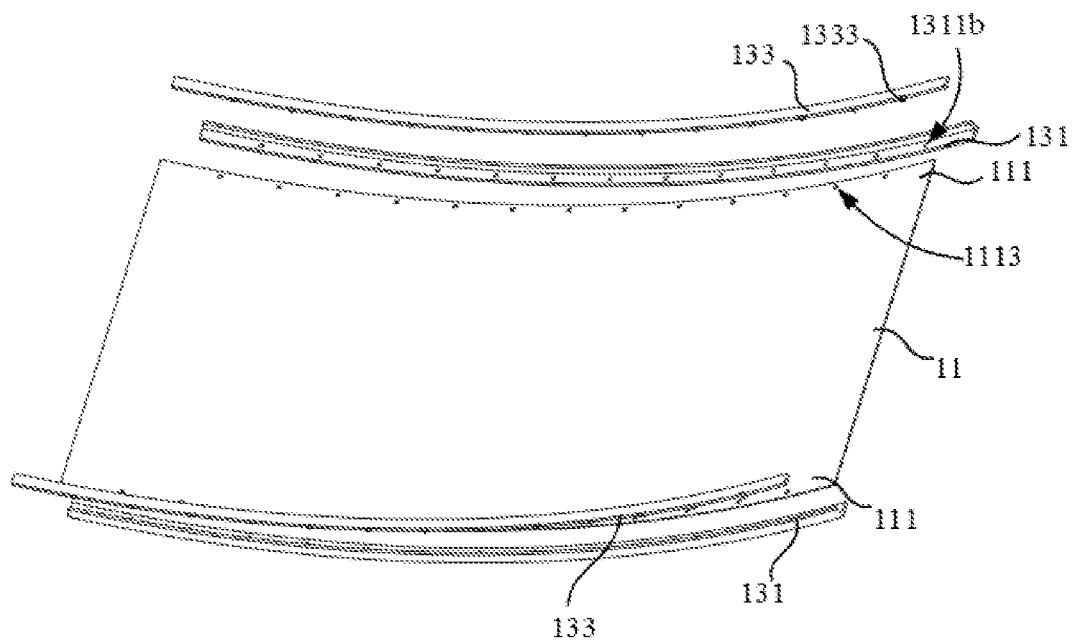
FIG. 4 is a schematic structural view of the backplane in the backlight module according to another embodiment of the present disclosure.

As shown in FIG. 4, the arc side 111 is defined with a first clamping hole 1113. One of the first side 1311 or the second arc member 133 is defined with a second clamping hole 1311b. A surface of the other one of the first side 1311 and the second arc member 133 is provided with a clamping protrusion 1333, and the clamping protrusion 1333 is configured to pass through the first clamping hole 1113 to be inserted into the second clamping hole 1311b.

In the first structure of the backplane 10, the first side 1311 is threadedly connected to the second arc member 133, which can ensure the structural stability. The backplane can maintain a good structural stability after being disassembled and assembled for many times. Specifically, the first connecting hole 1311a is defined on the first side 1311, the second connecting hole 1331 is defined on the second arc member 133, and the third connecting hole 1111 is defined on the arc side 111. The first connecting hole 1311a, the second connecting hole 1331 and the third connecting hole 1111 are matched to each other in size and shape. The connecting member 15 is configured to successively pass through the first connecting hole 1311a, the third connecting hole and the second connecting hole 1331, to clamp the arc side 111 and ensure the stability of the curvature of the arc side 111. In other embodiments, instead of making holes in the arc side 111, the first side 1311 and the second arc member 133 protrude from the edge of the arc side 111. The first connecting hole 1311a is connected to the second connecting hole 1331 through the connecting member 15 to clamp the arc side 111.

There are a plurality of the first connecting holes 1311a, the second connecting holes 1331 and the third connecting holes 1111. The first connecting holes 1311a are distributed at intervals in the extension direction of the first side 1311. The first connecting hole 1311a, the second connecting hole 1331 and the third connecting hole 1111 are provided in a one-to-one correspondence to ensure the curvature stability of each part of the backplane body 11.

In the second structure of the backplane 10, the first side 1311 is connected to the second arc member 133 by a snap connection. That is to say, a clamping protrusion 1333 is formed on the surface of the second arc member 133 toward the first side 1311, a second clamping hole 1311b is defined in the first side 1311, and a first clamping hole 1113 is defined in the arc side 111. When the arc side 111 is placed on the first side 1311, the first clamping hole 1113 corresponds to the second clamping hole 1311b, the clamping protrusion 1333 passes through the first clamping hole 1113 and then clamps in the second clamping holes 1311b, thereby achieving a stable connection relationship. The connection method is convenient and quick, which can improve the assembly efficiency and facilitate the disassembly of the arc fixing components 13 with different curvatures. There are a plurality of the clamping protrusions 1333, the first clamping holes 1113 and the second clamping holes 1311b. The plurality of clamping protrusions 1333 are distributed at intervals in the extension direction of the second arc member 133, so as to realize the stability of the snap connection and ensure the stability of the curvature of each part of the backplane body 11.

In other embodiments, it is also possible to form a clamping structure on the first side 1311 and define a hole on the second arc member 133 to realize snap connection among the three.

Figure 7:
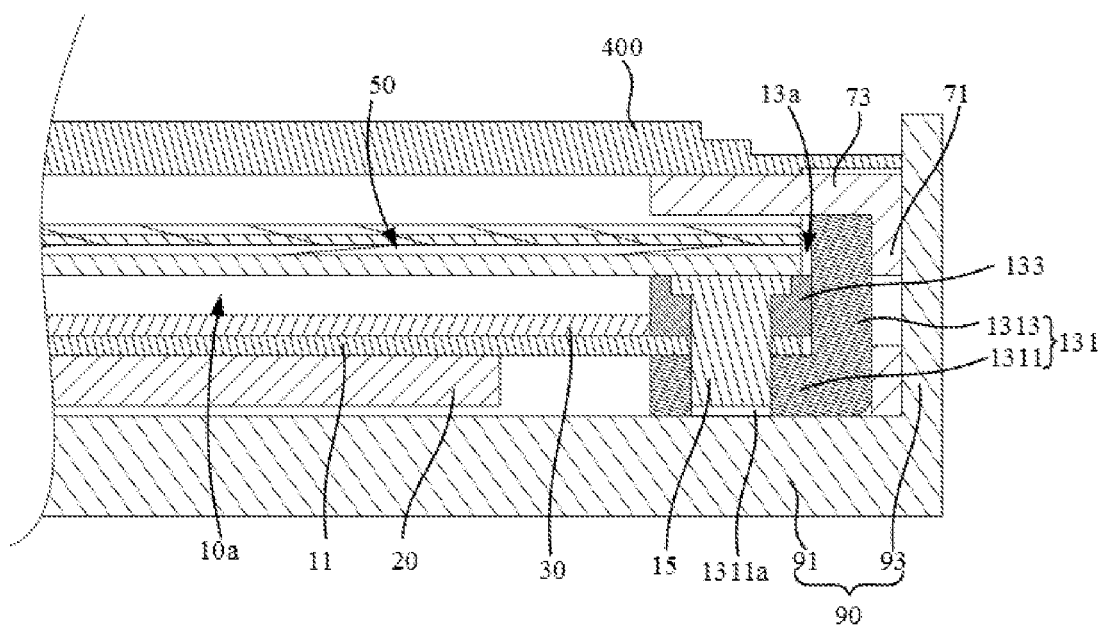
FIG. 7 is a partial schematic cross-sectional view of the curved display device in FIG. 6 along a longitudinal direction.

As shown in FIG. 5 and FIG. 7, in an embodiment, the backlight module 100 further includes an optical film 50. The second side 1313 protrudes from a surface of the second arc member 133 away from the first side 1311. The second side 1313 is enclosed with the surface of the second arc member 133 away from the first side 1311 to form a clamping groove 13a. And the optical film 50 is provided in the clamping groove 13a and covers an opening of the mounting groove 10a.

It is understandable that the backlight module 100 further includes an optical film 50 provided on the light-emitting side of the backlight 30 to improve and adjust the light emitted from the backlight 30, thus the light emitted from the backlight module 100 can be more uniform and brighter. The optical film 50 may be a diffusion sheet, a brightness enhancement sheet, a light homogenizing sheet 53 or an anti-reflection film, etc., which is not limited herein. In this embodiment, in order to further facilitate the fixation of the optical film 50, the second side 1313 protrudes from the surface of the second arc member 133 away from the first side 1311. The surface of the second arc member 133 away from the first side 1311 is enclosed with the second arc member 133 to form a clamping groove 13a, and the optical film 50 can be provided in the clamping groove 13a to achieve stable fixation. The optical film 50 covers the opening of the mounting groove 10a to completely receive the light from the backlight 30, which improves the light utilization rate and reduces the light leakage. Besides, the second side 1313 can also position the second arc member 133 to improve the convenience of connection between the second side 1313 and the first side 1311.

Further, in other embodiments, the backplane body 11 can be detachably connected to the first arc member 131 and then detachably connected to the second arc member 133. During the subsequent use process, the second arc members 133 with different thickness can be replaced. The distance between the backlight 30 and the optical film 50 is adjusted by replacing the second arc members 133 with different thicknesses. Furthermore, the optical density can be adjusted to improve the light-emitting effect, and the entire arc fixing component 13 does not need to be replaced, which effectively reduces the production cost and facilitates disassembly and assembly.

As shown in FIG. 5, in an embodiment, the optical film 50 includes a diffusion plate 51, and the diffusion plate 51 is attached to the surface of the second arc member 133 away from the first side 1311. A gap is formed between the diffusion plate 51 and the backlight 30. A thickness of the second arc member 133 is equal to a width of the gap and a thickness of the backlight 30.

In an embodiment, the optical film 50 includes a diffusion plate 51, which can diffuse the light from the backlight 30 to achieve a light mixing effect and improve the uniformity of light emission. The diffusion plate 51 is provided on the surface of the second arc member 133. The connecting between the diffusion plate 51 and the second arc member 133 can be achieved by bonding or other means, which can enhance the stability of the connection. A gap is formed between the diffusion plate 51 and the backlight 30. The thickness of the second arc member 133 can determine the width of the gap. Thus, the width of the gap can be adjusted by adjusting the thickness of the second arc member 133. While the curvature of the backplane body 11 is adjusted, the light emitting effect of the backlight module 100 is further adjusted to improve the light mixing effect.

In this embodiment, the backlight 30 includes a plurality of lamp beads 31 distributed in an array, the backlight module 100 satisfies the following relationship: d=3*p/(4*tan 0.5a).

d represents the width of the gap, p represents a distance between two lamp beads 31 and a represents a light-emitting angle of each of lamp beads 31.

The backlight 30 is plate-shaped, and the backlight is screwed or snap-connected to the backplane body.

In this embodiment, the backlight 30 is plate-shaped, including a whole circuit board and a plurality of lamp beads 31 provided on the circuit board. The plurality of lamp beads 31 are evenly distributed in an array to ensure uniformity of light emission and facilitate the overall installation of the backlight 30. According to the formula d=3*p/(4*tan 0.5a), the width of the gap that needs to meet the light-emitting effect can be obtained. Further the thickness of the second arc member 133 is equal to the sum of "d" and "h" (h represents a thickness of the backlight 30). The distance between the diffusion plate 51 and each lamp bead 31 can be ensured to be uniform, thereby improving the display effect of the backlight module 100. The second arc member 133 can not only clamp the backplane body 11, but also obtain a more accurate thickness value through the spacing and light-emitting angle of the lamp beads 31. Thus, the gap can be adjusted to achieve a better light-emitting effect.

When the lamp beads 31 are mounted on the backplane body 11 through the entire circuit board, the backlight 30 can be screwed to the backplane body 11, which can improve the installation stability of the backlight 30, and ensure that the backlight 30 also has the same stable curvature as the backplane 10 body to ensure the luminous effect.

In addition, the second arc member 133 can be made of a material with low thermal conductivity or high thermal conductivity according to the heating intensity of the backlight 30. For example, when the heating intensity of the backlight 30 is high, the second arc member 133 can be made of a material with low thermal conductivity, such as ordinary ceramics with low thermal conductivity, to reduce the heat transfer to the optical film 50 and prevent the optical film from being seriously deformed. When the backlight 30 is not seriously heated, the second arc member 133 can be made of a material with high thermal conductivity, such as metal. Thus, the backplane 10 can also dissipate heat from the light guide plate through the heat conduction of the second arc member 133, and also contact the second side 1313 of the first arc member 131 to further improve the heat dissipation effect.

As shown in FIG. 7, the backlight module 100 further includes a plastic frame 70. The plastic frame 70 includes a first frame 71 and a second frame 73. An angle is formed between the first frame 71 and the second frame 73. The first frame 71 is detachably connected to the second side 1313 and the second frame 73 covers an opening of the clamping groove 13a.

In an embodiment, the plastic frame 70 of the backlight module 100 includes a first frame 71 and a second frame 73. The angle is formed between the first frame 71 and the second frame 73. Both the first frame 71 and the second frame 73 are integrally formed to ensure the strength and structural stability of the plastic frame 70 and facilitate assembly. The plastic frame 70 is provided on the outer side of the first arc member 131. Specifically, the first frame 71 is attached to the second side 1313 and is detachably connected to the second side 1313, and the second frame 73 covers the opening of the clamping groove 13a. Thus, while the arc fixing component 13 can be protected, the optical film 50 can also be clamped, and the optical film 50 can be prevented from being detached from the clamping groove 13a, thereby ensuring the stability of the overall structure of the backlight module 100. The plastic frame 70 can also provide support for the display panel 400, so that the display panel 400 can be fixed to form a stable curved display device 1000.

The plastic frame 70 can be snap-connected with the second side 1313. For example, the outer side of the second side 1313 is provided with a plurality of buckles, and the first frame 71 of the plastic frame 70 is provided with the clamping holes corresponding to the buckles, to snap plastic frame 70 with the second side 1313, which is simple and convenient, and effectively improves the assembly efficiency. In other embodiments, the plastic frame 70 can also be screwed to the second side 1313.

As shown in FIG. 5 and FIG. 7, in an embodiment, the backlight module 100 further includes a rear shell 90, the rear shell 90 includes a bottom plate 91 and a side plate 93 provided at a periphery of the bottom plate 91. The bottom plate 91 is in abutment with a surface of the first side 1311 away from the optical film 50. The side plate 93 is wrapped around an outer periphery of the first frame 71 and is detachably connected to the first frame 71.

In this embodiment, in order to further enhance the structural stability, the backlight module 100 further includes the rear shell 90. The rear shell 90 includes the bottom plate 91 and the side plate 93 provided on the bottom plate 91. The bottom plate 91 can protect the surface of the backplane 10 and the side plate 93 can protect the plastic frame 70. The bottom plate 91 and the side plate 93 can protect and limit the display panel 400 after assembling.

Specifically, the side plate 93 is detachably connected to the first frame 71. The inner surface of the side plate 93 can be protruded with buckles, and the first frame 71 is provided with clamping holes corresponding to the buckles, so that the side plate 93 can also be snap-connected with the first frame 71, which improves the convenience of assembly. The buckle of the side plate 93 needs to be misaligned with the buckle of the second side 1313, so as to be convenient to be snapped with the clamping holes at different positions on the first frame 71 at the same time, and ensure the connection stability. In other embodiments, the first frame 71 can also be screwed to the side plate 93.

Figure 6:
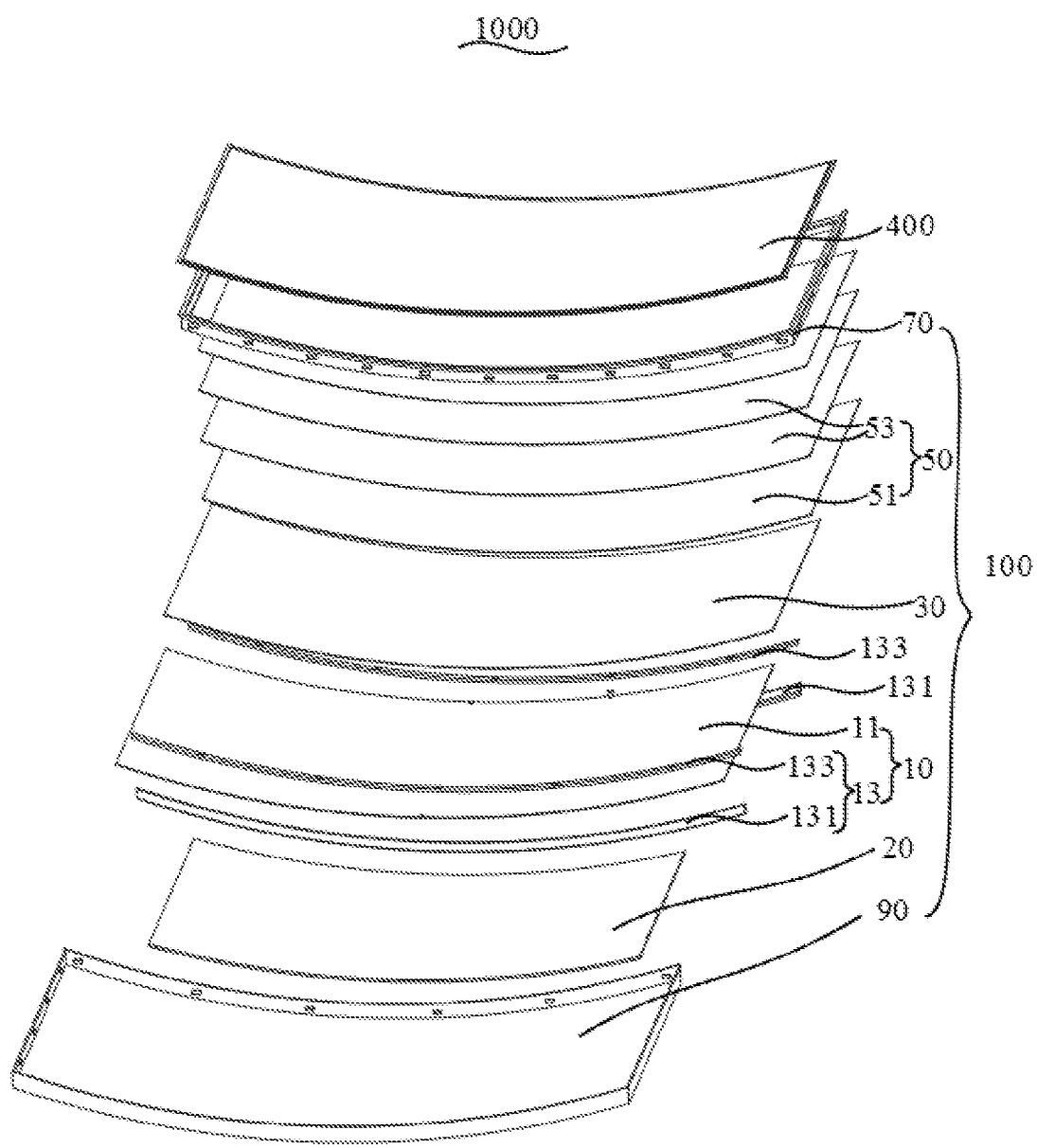
FIG. 6 is a schematic exploded view of a curved display device according to an embodiment of the present disclosure.

As shown in FIG. 6, in an embodiment, a surface of the backplane body 11 away from the backlight 30 is provided with a heat sink 20, and a thickness of the heat sink 20 is less than or equal to the thickness of the second arc member 133.

In an embodiment, in order to enhance heat dissipation performance of the backlight module 100, a heat sink 20 is provided on the surface of the backplane body 11 away from the backlight 30. The heat sink 20 can be made of copper, aluminum alloy and other thermally conductive materials, which have a better thermal conductivity to facilitate the dispersion of heat from the backlight 30 to achieve a better heat dissipation effect, so as to protect the backlight 30, improve the performance of the backlight module 100 and prolong the service life.

Meanwhile, the heat sink 20 is provided between the two first arc members 131, and the thickness of the heat sink 20 is less than or equal to the thickness of the second arc member 133, which can effectively use the already occupied space for assembly. In addition, it can reduce the increase in the thickness of the backlight module 100 to obtain a more ultra-thin curved display device 1000 while ensuring better curvature and achieving better heat dissipation. The heat sink 20 can also be threadedly fixed on the surface of the backplane body 11 to achieve a more stable connection structure.

The bottom plate 91 of the rear shell 90 wraps the heat sink 20. Thus, a more stable mounting structure with a more aesthetically pleasing appearance is obtained.

As shown in FIG. 6 and FIG. 7, the present disclosure further provides a curved display device 1000. The curved display device 1000 includes a display panel 400 and the backlight module 100 described above, the display panel 400 is provided on a light-emitting side of the backlight module 100. The specific structure of the backlight module 100 refers to the above-mentioned embodiments. Since the backlight module 100 of the curved display device 1000 adopts all the technical solutions of the above-mentioned embodiments, it has at least all the beneficial effects brought by the technical solutions of the above-mentioned embodiments, which will not be repeated here.

The backlight module 100 includes a backplane 10, a plastic frame 70 and a rear shell the connection relationship among the three can refer to the above-mentioned embodiments. The display panel 400 can be installed on the surface of the plastic frame 70 away from the backplane 10 and fixed by glue or tapes, to obtain the curved display device 1000 with a narrow frame. In addition, the side plate 93 of the rear shell 90 can extend to the display panel 400 to abut the side surface of the display panel 400, which can improve the installation stability of the display panel 400.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A curved display device, comprising:
   a backlight module; and
   a display panel provided on a light-emitting side of the backlight module,
   wherein the backlight module comprises:
   a backplane comprising a backplane body and two arc fixing components; wherein the backplane body is provided with two arc sides opposite to each other, one of the two arc fixing components is detachably installed at one of the two arc sides to define a curvature of the backplane body, the two arc fixing components are enclosed with an inner surface of the backplane body to form a mounting groove; and
   a backlight provided into the mounting groove
   wherein each arc fixing component comprises a first arc member and a second arc member;
   the first arc member is provided on one surface of one arc side;
   the second arc member is provided on the other surface of the arc side and detachably connected to the first arc member to clamp the arc side;
   two second arc members are enclosed with the backplane body to form the mounting groove; and
   the backlight is embedded into the mounting groove.

2. A backlight module, applied to a curved display device, comprising:
   a backplane comprising a backplane body and two arc fixing components, wherein the backplane body is provided with two arc sides opposite to each other, one of the two arc fixing components is detachably installed at one of the two arc sides to define a curvature of the backplane body, the two arc fixing components are enclosed with an inner surface of the backplane body to form a mounting groove; and
   a backlight provided into the mounting groove
   wherein each arc fixing component comprises a first arc member and a second arc member;
   the first arc member is provided on one surface of one arc side;
   the second arc member is provided on the other surface of the arc side and detachably connected to the first arc member to clamp the arc side;
   two second arc members are enclosed with the backplane body to form the mounting groove; and
   the backlight is embedded into the mounting groove.

3. The backlight module of claim 2, wherein:
   the first arc member comprises a first side and a second side;
   an angle is formed between the first side and the second side;
   the first side is attached to the other surface of the arc side and is detachably connected to the second arc member; and
   the second side is in abutment with a lateral surface of the arc side.

4. The backlight module of claim 3, wherein:
   the first side is defined with a first connecting hole, the second side is defined with a second connecting hole, the arc side is defined with a third connecting hole, and a connecting member is configured to successively pass through the first connecting hole, the third connecting hole and the second connecting hole to connect the second arc member, the backplane body and the first arc member; and/or
   the arc side is defined with a first clamping hole, one of the first side and the second arc member is defined with a second clamping hole, a surface of the other one of the first side and the second arc member is provided with a clamping protrusion, and the clamping protrusion is configured to pass through the first clamping hole to be inserted into the second clamping hole.

5. The backlight module of claim 3, further comprising:
   an optical film,
   wherein the second side protrudes from a surface of the second arc member away from the first side, the second side is enclosed with the surface of the second arc member away from the first side to form a clamping groove, and the optical film is provided in the clamping groove and covers an opening of the mounting groove.

6. The backlight module of claim 5, wherein the optical film comprises a diffusion plate, the diffusion plate is attached to the surface of the second arc member away from the first side, a gap is formed between the diffusion plate and the backlight, and a thickness of the second arc member is equal to a sum of a width of the gap and a thickness of the backlight.

7. The backlight module of claim 5, wherein the optical film is provided on a light-emitting side of the backlight.

8. The backlight module of claim 6, wherein:
the backlight comprises a plurality of lamp beads distributed in an array, the backlight module satisfies the following relationship:

$$d=3*p/(4*\tan 0.5a);$$

d represents the width of the gap, p represents a distance between two lamp beads, and a represents a light-emitting angle of each of the lamp beads; and/or
the backlight is plate-shaped, and the backlight is screwed or snap-connected to the backplane body.

9. The backlight module of claim 8, wherein the lamp beads are installed on the backplane body through a whole circuit board.

10. The backlight module of claim 6, wherein the backlight is a direct type backlight.

11. The backlight module of claim 5, further comprising:
a plastic frame comprising a first frame and a second frame,
wherein an angle is formed between the first frame and the second frame, the first frame is detachably connected to the second side, and the second frame covers an opening of the clamping groove.

12. The backlight module of claim 11, wherein the first frame is integrally formed with the second frame.

13. The backlight module of claim 11, further comprising:
a rear shell comprising a bottom plate and a side plate provided at a periphery of the bottom plate,
wherein the bottom plate is in abutment with a surface of the first side away from the optical film, and the side plate is wrapped around an outer periphery of the first frame and is detachably connected to the first frame.

14. The backlight module of claim 2, wherein a surface of the backplane body away from the backlight is provided with a heat sink, and a thickness of the heat sink is less than or equal to the thickness of the second arc member.

* * * * *